US007254627B2

(12) United States Patent
Hain

(10) Patent No.: US 7,254,627 B2
(45) Date of Patent: Aug. 7, 2007

(54) METHOD, SERVICE AGENT AND NETWORK MANAGEMENT SYSTEM FOR OPERATING A TELECOMMUNICATIONS NETWORK

(75) Inventor: Elke Hain, Birkenwerder (DE)

(73) Assignee: Alcatel, Paris (FR)

( * ) Notice: Subject to any disclaimer, the term of this patent is extended or adjusted under 35 U.S.C. 154(b) by 632 days.

(21) Appl. No.: 10/216,779

(22) Filed: Aug. 13, 2002

(65) Prior Publication Data

US 2003/0055960 A1  Mar. 20, 2003

(30) Foreign Application Priority Data

Aug. 21, 2001 (EP) ................... 01440279

(51) Int. Cl.
*G06F 15/173* (2006.01)
(52) U.S. Cl. .................. 709/223; 709/224; 719/318
(58) Field of Classification Search ........... 709/207, 709/220, 223–224, 225; 719/317–318, 316; 707/1, 104.1, 10; 370/254
See application file for complete search history.

(56) References Cited

U.S. PATENT DOCUMENTS

| | | | | |
|---|---|---|---|---|
| 5,758,071 A | * | 5/1998 | Burgess et al. | 709/220 |
| 6,131,112 A | * | 10/2000 | Lewis et al. | 709/207 |
| 6,205,563 B1 | * | 3/2001 | Lewis | 714/47 |
| 6,363,421 B2 | * | 3/2002 | Barker et al. | 709/223 |
| 6,366,926 B1 | * | 4/2002 | Pohlmann et al. | 707/104.1 |
| 6,470,384 B1 | * | 10/2002 | O'Brien et al. | 709/223 |
| 6,484,200 B1 | * | 11/2002 | Angal et al. | 709/224 |
| 6,493,756 B1 | * | 12/2002 | O'Brien et al. | 709/224 |
| 6,603,396 B2 | * | 8/2003 | Lewis et al. | 340/506 |
| 6,631,363 B1 | * | 10/2003 | Brown et al. | 707/1 |
| 6,820,121 B1 | * | 11/2004 | Callis et al. | 709/225 |
| 6,941,367 B2 | * | 9/2005 | Vosseler et al. | 709/224 |
| 6,941,557 B1 | * | 9/2005 | Jakobson et al. | 719/316 |
| 6,985,901 B1 | * | 1/2006 | Sachse et al. | 707/10 |
| 2002/0004828 A1 | * | 1/2002 | Davis et al. | 709/223 |
| 2002/0012011 A1 | * | 1/2002 | Roytman et al. | 345/736 |
| 2002/0073062 A1 | * | 6/2002 | Cerami et al. | 707/1 |
| 2002/0120736 A1 | * | 8/2002 | Martin et al. | 709/224 |
| 2002/0174207 A1 | * | 11/2002 | Battou | 709/223 |
| 2004/0024869 A1 | * | 2/2004 | Davies | 709/224 |

FOREIGN PATENT DOCUMENTS

| | | |
|---|---|---|
| EP | 0 687 089 A1 | 12/1995 |
| EP | 0 739 111 A2 | 10/1996 |
| EP | 0 909 056 A2 | 4/1999 |
| JP | 20011842181 A * | 7/2001 |
| WO | WO 03/036914 A1 * | 5/2003 |

* cited by examiner

*Primary Examiner*—ThuHa Nguyen
(74) *Attorney, Agent, or Firm*—Sughrue Mion, PLLC

(57) ABSTRACT

A method for operating a telecommunications network, a service agent for the same and a network management system, equipped with the latter, particularly in the form of at least one computer of a network management system, or a user interface module, in which event messages concerning a network element of the telecommunications network are transmitted to the service agent for maintenance and/or monitoring and/or control service, and the event messages which are irrelevant to the service to be provided by the service agent are filtered out. The service agent determines a relationship between a first relevant event message and a second event message in respect of the service to be provided and instructs output means to output a first event message and a second event message according to the relationship.

10 Claims, 3 Drawing Sheets

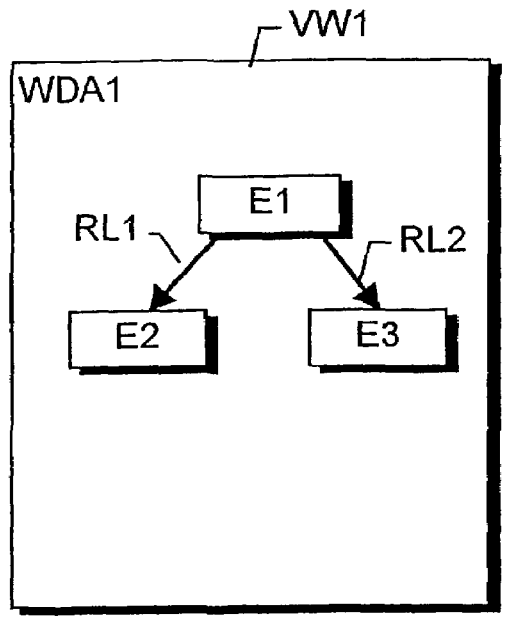
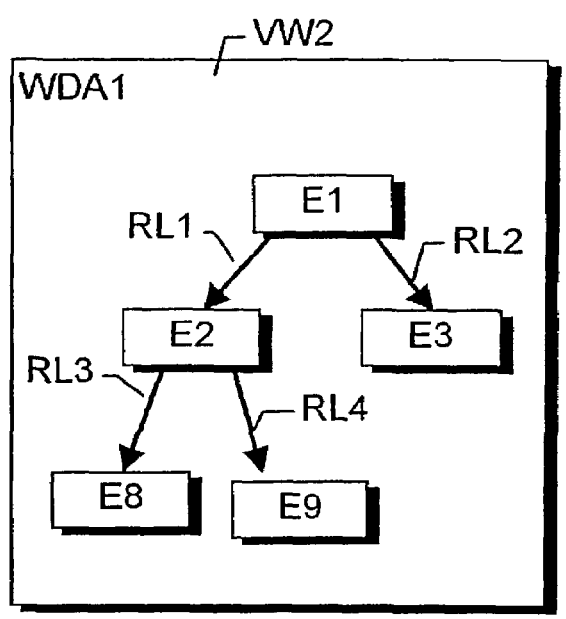
Fig. 4A                Fig. 4B
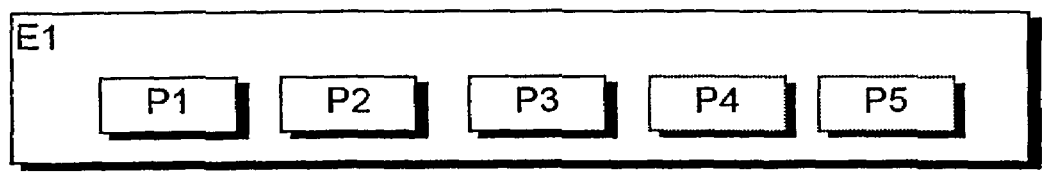
Fig. 5
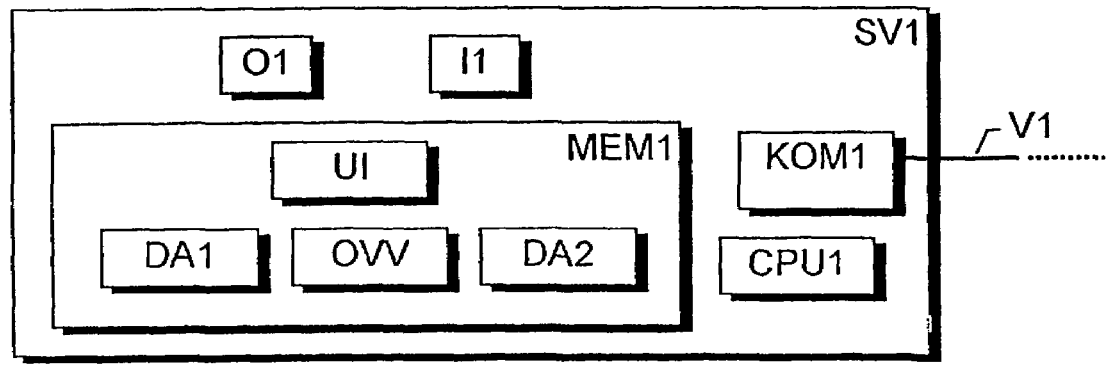
Fig. 6

METHOD, SERVICE AGENT AND NETWORK MANAGEMENT SYSTEM FOR OPERATING A TELECOMMUNICATIONS NETWORK

BACKGROUND OF THE INVENTION

The invention is based on a priority application EP01440279.6 which is hereby incorporated by reference.

The present invention concerns a method for operating a telecommunications network, a service agent for the same and a network management system, equipped with the latter, particularly in the form of at least one computer of a network management system, or a user interface module, for the same.

When events occur, network elements of a telecommunications network, for example, switching centres, routers, network services or the like, send event messages, in the form of event signals, to a network management system which manages them. The event signals concern, for example, a fault in the respective network element, the exceeding of a limiting value or the alteration of the configuration status of the managed network element. In the network management system, the event messages are processed in various ways; for example, they are written into a databank or displayed on a user interface. Generally in such cases, it is common for the event messages to be displayed in the form of lists, which are frequently of a considerable size. This is particularly due to the fact that an event, for example, a fault, initiates numerous secondary events, particularly secondary faults. If, for example, there is a power supply failure in a network element, the network element signals not only the failure of the power supply, but also failures of modules which are dependent on the power supply. If the network element is a switching centre, for example, numerous connections which are operated by the switching centre are also signalled as failed or faulty.

The flood of event messages could be channelled by, for example, having only the important event messages, but not the less important event messages, displayed in an event list. For this, however, an operator of the network management system must specify extensive filter criteria in order to filter the list of event messages so that he ultimately obtains a display of only the most important event messages. This, however, has the disadvantage that the less important event messages, which are possibly dependent on the more important event messages, are suppressed and remain invisible to the operator.

The same problems arise if the event messages are signalled not to a user interface for a human operator but are signalled, for example, to a fault rectification process provided for automatic fault rectification. Its functioning can also be impaired, or even rendered impossible, by a flood of event messages.

OBJECT OF THE INVENTION

The object of the invention is to improve the operability of a telecommunications network in respect of the processing of event messages.

This object is achieved by a method for operating a telecommunications network (NW), in which event messages (E1-E11) concerning at least one network element (N1-N3) of the telecommunications network (NW) are transmitted to a service agent (DA1, DA2) for a maintenance and/or monitoring and/or control service in respect of the at least one network element (N1-N3), the event messages (E10, E11) which are irrelevant to the service to be provided by means of the service agent (DA1, DA2) are filtered out, the service agent (DA1, DA2) determines at least one relationship (RL1) between at least one first relevant event message (E1) and at least one second event message (E2) in respect of the service to be provided, and the service agent (DA1, DA2) instructs output means (UI) to output the at least one first event message (E1) and/or the at least one second event message (E2) according to the at least one relationship (RL1).

Additionally provided for the purpose of achieving the object are: a service agent, as well as network management system equipped with at least one such service agent, particularly in the form of at least one computer or a user interface module.

This invention is based on the concept of outputting event messages for a service to be provided, for example, a maintenance and/or monitoring and/or control service, in respect of at least one network element, to output means, for example, a user interface, for example, in a visible and/or audible or other appropriate manner, on the basis of the respective service to be provided, i.e., as it were, task-based.

The event messages are first filtered, by filtering out event messages which are irrelevant to the service to be provided. For example, if user connections of the telecommunications network are to be controlled and/or monitored as a service, event messages in respect of other faults in the telecommunications network, e.g. in a signalling network of the telecommunications network, are filtered out. If faults in the signalling network are to be rectified, however, event messages in respect of user connections, for example, are filtered out as being irrelevant to the service to be provided.

Event messages, within the meaning of the invention, are non-critical event messages, e.g. cyclically transmitted measured-value messages, and also critical event messages, such as alarms.

The event messages which have not been filtered out, which are relevant to the service to be provided, are then related to one another. Although, in the simplest case, this can mean that all relevant event messages are grouped on, as it were, the same relevance level and are therefore of equal relevance to the service to be provided, of greater interest, however, is the case whereby the event messages differ in relevance, i.e., for example, a first event message is more relevant than a second event message in respect of the service to be provided and the event messages are represented accordingly. Moreover, it is conceivable for the second event message to be dependent on the first event message. To return to the initially stated example, this could mean, for example, that a first event message signals the failure of a power supply of a network element and a second event message signals a secondary fault, for example, the failure of an input/output module of the network element which is dependent on the power supply.

In any case, at least one relationship is first determined between at least one first and one second event message and the event messages which are relevant in respect of the service to be provided are output according to the at least one relationship. An appropriate output means for this, for example, is a user interface of a network management system on which, according to the invention, not only the event messages per se, but also the relationships existing between them, are visually represented. Embodiments for the visual representation of event messages and relationships existing between them are presented at a later point, in connection with the embodiment examples. In any case, the event messages are presented to an operator in a structured form and in relation to one another, so that the operator rapidly obtains an overview in respect of the service to be provided and, in particular, can prioritize the processing of the event messages which are of greatest importance to the service, for example, can rectify first a fault which has particularly serious consequences.

The advantages of the invention are also evident if the interrelated event messages are forwarded to an event processing process, for example, a process which automatically rectifies a fault. For example, a processing process could be provided which, upon the previously explained event messages "power supply defective" and "input/output module defective", takes appropriate measures, for example, switches over to a redundant network element with an intact power supply or to an input/output module which has not yet been signalled as defective. If the event message "input/output module defective" is output to the processing process, according to the invention, as an event message which is dependent on the event message "power supply defective", the processing process can directly take appropriate measures, namely, switch over to the redundant network element, and does not first attempt to switch over from the defective input/output module to an input/output module which has not yet been signalled as defective. However, this measure would be unsuccessful in this case, since the input/output module to which the switchover has been made is also dependent on the defective power supply and is consequently not operational.

Particularly suitable for realization of the method according to the invention is a service agent which determines the relationship(s) between the event messages relevant to the provision of the services and instructs output means of the event messages according to the relationship or relationships.

The service agent can be realized in a variety of ways, for example, as a program module whose program code can be executed by a control means, for example, a processor, of a computer. However, the service agent can also be realized, at least partially, in the form of hardware, programmable logic chips, for example, being suitable for this purpose. It is also possible for a computer as a whole, e.g. a client computer of a network management system, to constitute a service agent.

Further advantageous developments of the invention are disclosed in the dependent claims and in the description.

As already mentioned, the event messages are advantageously output in dependence on their relevance to the service to be provided.

Dependences are expediently determined as relationship (s) between the event messages. The dependences can be so-called father/son dependences or, also, mutual dependences.

In this case, provision is preferably made whereby an event message which is dependent on another event message is output with secondary ranking. Thus, a so-called father event message is output with prior ranking and a son event message which is dependent on the latter is output with secondary ranking. An operator of a user interface on which the two event messages are displayed thus rapidly obtains an overview of the event messages which are to be processed as a priority and can nevertheless access the dependent event messages which have secondary ranking.

Various output forms are expediently provided for the respective event messages. For example, a father event message can be output in a first output form and the son event message(s) dependent on it output in a second output form.

A hierarchical representation of the event messages provides a good overview of the event messages which are relevant to a service. The representation preferably has a tree structure with, for example, branches from a father event message to son event messages, from which further branches lead to son event messages which are dependent on them, etc. A dependence cascade or dependence tree, as it were, is thus displayed.

It is also possible, however, in the case of a hierarchical representation of the event messages, for so-called register cards to be used with, for example, one or more particularly relevant event messages being represented on a first register card and event messages which are less relevant and/or which are dependent on the event message(s) represented on the first register card being represented on a second register card which is normally covered by the first register card.

The event messages can also be represented in respectively separate lists, the event messages being assigned to a list, for example, in dependence on the relevance to the respective service.

It is also possible, in the case of event messages which, as a whole, are relevant to a service to be provided, for portions of those event messages to be irrelevant to the service. For example, the event message concerning the failed module could contain information on the sender of the event message. Provision is preferably made whereby, of an event message which, as a whole, is relevant to the service to be provided, only that portion which is relevant in respect of the service to be provided is output. For example, in this case, the aforementioned sender information is eliminated. By contrast, information by which the faulty power supply can be located within the network element is output.

Any approaches which, respectively, can be applied individually—or also in any combination with one another—are possible for filtering out the event messages which are irrelevant in respect of the service to be provided.

For example, the irrelevant event messages can be previously filtered out, at least partially, by a group agent which obtains the event messages from one or more network elements. Filter criteria could be predefined for this purpose in the group agent. It is also possible, however, for the service agent to transmit to the group agent the filter criteria required by the latter—for permanent storage or, also, on an ad hoc basis only.

In the case of another variant, the filtering is performed, wholly or partially, by a so-called filter agent. In the case of the latter, likewise, filter criteria can be predefined in respect of the service agent to be serviced. It is also possible, however, for the group agent to send filter criteria in respect of the desired event messages to the filter agent. Such a filter agent can be, for example, a so-called event forwarding discriminator (EFD) or alarm forwarding discriminator (AFD). It is also possible for the service agent to start the filter agent and, for example, following receipt of the desired, relevant event messages, to terminate it again. The filter agent can be connected, for example, between the aforementioned group agents and the service agents.

The service agent itself can also filter out the event messages which are irrelevant to the service to be provided. Appropriate filter means can be provided for this purpose in the service agent.

BRIEF DESCRIPTION OF THE DRAWINGS

The invention and its advantages are described in the following with reference to an embodiment example and with the aid of the drawing, wherein:

FIG. 5 shows an event message E1 with information parameters P1-P5, and FIG. 6 shows a schematic representation of a server SV1 of FIG. 1.

DETAILED DESCRIPTION OF THE INVENTION

Figure 1:
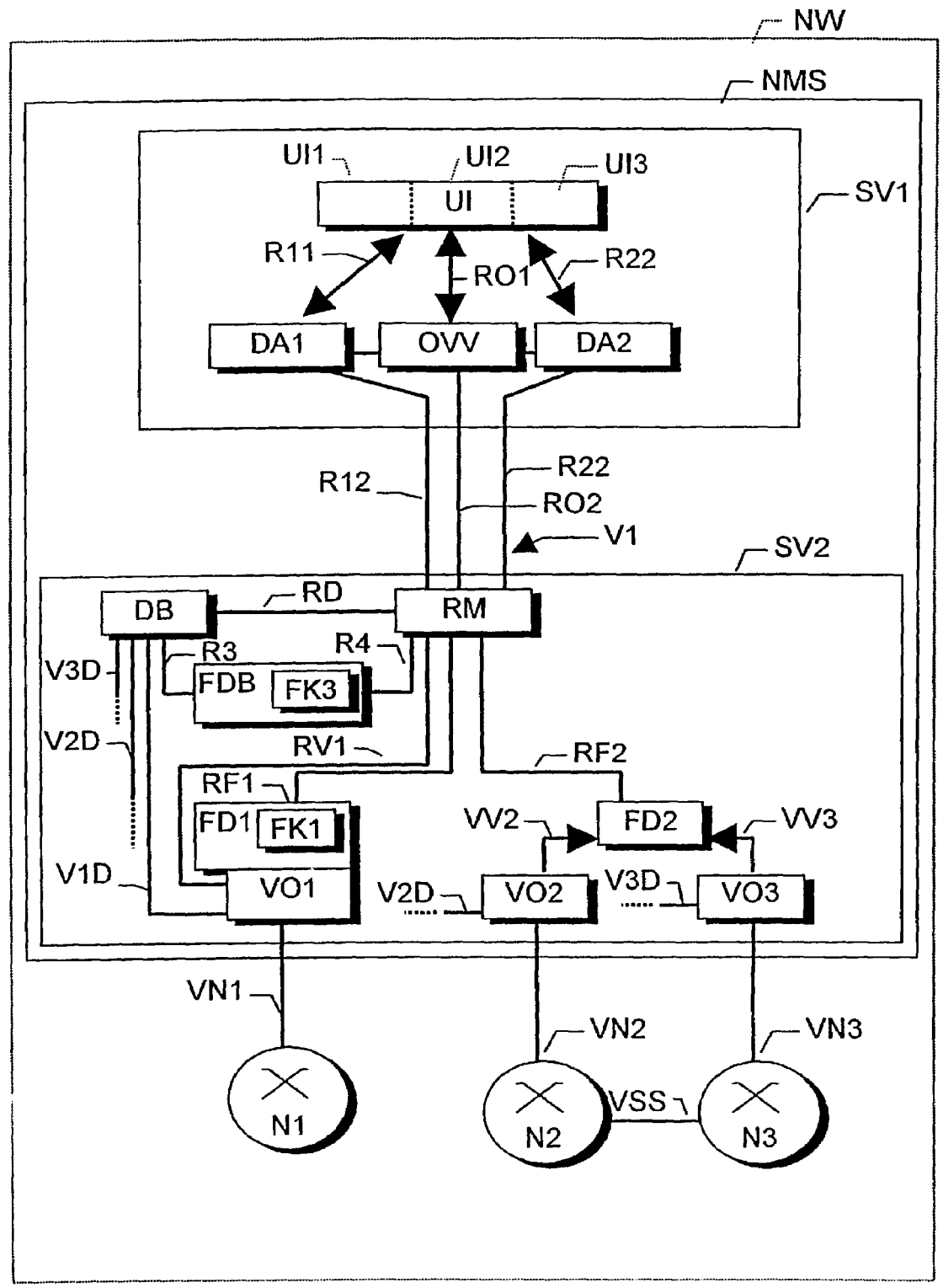
FIG. 1 shows a network management system NMS, for controlling a network NW, by means of which the method according to the invention can be performed.
Figure 2:
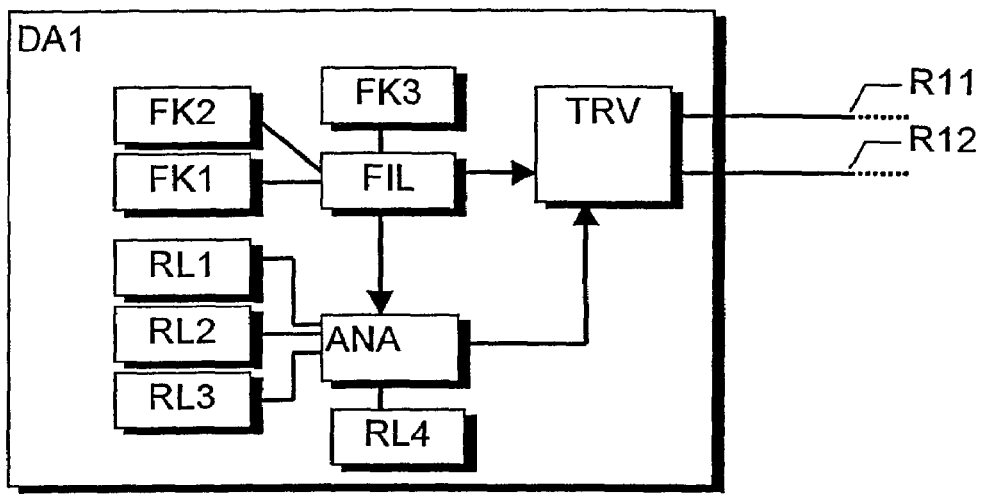
FIG. 2 shows a schematic representation of a service agent DA1 according to the invention, from FIG. 1.

The network management system NMS can be used to manage, control and monitor network elements N1, N2, N3 of a network NW. The network NW is, for example, a telephone network and/or computer network and/or data network. The network elements N1-N3 are, for example, switching centres, routers, servers, or service computers for providing services of an intelligent network (IN), or a network service. The network NW can also contain further devices which are not represented, for example, further network elements, network services or the like.

In the present case, the network management system NMS contains servers SV1, SV2, which are represented in schematic form only. The servers SV1, SV2 are computers or computer networks which are operated for example using a UNIX or Windows NT operating system. The server SV2 has the same functional structure as the server SV1, which is explained briefly in the following. It contains transmitting and receiving means KOM1, for example, LAN or WAN interface cards (LAN=local area network, WAN=wide area network), modems or the like, by means of which data can be transmitted and received respectively. The server SV1 also has memory means MEM1, for example, hard-disk drives and memory chips, as well as control means CPU1, for example, a processor or a cluster of processors. The control means CPU1 executes commands of the aforementioned operating system which is stored in the memory means MEM1. Also stored in the memory means MEM1 are a user interface module UI or, in a variant of the invention which is explained further at a later point, several user interface modules UI1-UI3, service agents DA1, DA2, as well as a list module OVV, whose program code can be executed by the control means CPU1. The server SV1 additionally comprises output means O1, for example, one or more monitors and a loudspeaker, and input means I1, for example, a keyboard and mouse. Internal connections are not represented for the server SV1.

For the purposes of simplified representation, the servers SV1, SV2 are represented as computers of the same type. It is also possible, however, for the server SV1 to perform the function of a client computer which is connected as a client to, for example, the server SV2. The network management system NMS can also contain other servers and/or clients, in addition to the servers SV1, SV2. However, the network management system NMS could also contain only a single server.

The network elements N1, N2, N3 send event messages to so-called managed objects VO1, VO2 and VO3 respectively via connections VN1, VN2 and VN3 respectively, which pass via a control network which is not represented in greater detail. The event messages relate, for example, to faults, limit-value infringements, load messages, changes in the configuration status of the respective network element N1-N3 or other events affecting the respective network element N1-N3. The managed objects VO1, VO2, VO3 represent the network elements NE1-NE3 in the network management system NMS. For example, the managed objects VO1-VO3 convert event messages sent by the network elements NE1-NE3 into a format which is understood by the other components of the network management system NMS. In the inverse direction, the managed objects VO1-VO3 convert instructions, which are to be sent by components of the network management system NMS to the network elements N1-N3, into a format which can be understood by the latter.

Provided in the present case for the purpose of managing, operating and maintaining the managed objects VO1-VO3, or the network elements N1-N3 assigned to them, are service agents DA1, DA2 which are designed as processes or groups of processes executed by the server SV1. For example, software or hardware faults in the network elements N1-N3 can be ascertained and/or rectified by means of the service agents DA1, DA2. In addition, for example, it is possible to monitor and/or control the load on the network elements N1-N3, or calculate charges to be determined and/or calculated for connections established by the network elements N1-N3, for example, a connection VSS between the network elements N2-N3.

The service agents DA1, DA2 process event messages which are sent by the network elements N1-N3. The service agents DA1, DA2 instruct the user interface module UI or, in the case of a preferred embodiment of the invention, the user interface modules UI1 or UI3, to output the processed event messages. The server SV1 is also provided with a list module OVV which, in a known manner, represents in list form, by means of the user interface module UI or UI2, the event messages received by the server SV1. The user interface module UI is assigned jointly to the service agents DA1, DA2 and to the list module OVV. It is also possible, however, in the case of a preferred embodiment of the invention, for the user interface modules UI1, UI3 and UI2 to be assigned to the service agents DA1, DA2 and/or to the list module OVV as individual user interface modules, for example, if the network management system NMS has an object-based design. Moreover, the service agents DA1, DA2 can be designed so that the functions of the user interface modules UI1 and/or UI3 are self-executing with, in an X-Window environment, for example, corresponding X-Window output functions being contained in the service agents DA1, DA2.

The functioning of the service agents DA1, DA2 is explained more fully in the following:

In the following, it is assumed that the service agent DA1 is provided, for example, for the purpose of rectifying hardware faults in the network element N1. The network element N1 sends its event messages to the managed object VO1. The latter forwards the event messages to a databank DB of the server SV2 via a connection V1D. The managed object VO1 also sends the event messages to a filter agent FD1.

The filter agent FD1 is located in front of the managed object VO1, towards the service agent DA1, and is, for example, a so-called event or alarm forwarding discriminator (EFD or AFD respectively). The filter agent FD1 contains program code which is executed by control means of the server SV2. Stored in the filter agent FD1 are filter criteria FK1 by which the filter agent FD1 filters out event messages which are irrelevant to the service agent DA1, for example, software faults or charge information. The filter criteria FK1 can be permanently stored in the filter agent FD1 or transmitted to the filter agents FDA by the service agent DA1. However that may be, in this case the filter agent FD1 sends event messages E1, E2, E3, E8, E9 and E10, via a connection RF1 of the server SV2, to a connection module RM of the server SV2. The connection module RM, which is also, for example, a program module whose program code is executed by the control means of the server SV2, sends the aforementioned event messages to the service agent DA1 via a connection R12. The connection R12 passes, for example, via a data network V1, e.g. a WAN or LAN, of the network management system NMS.

From the event messages E1-E3, E9-E10, which the service agent DA1 receives by means of transmitting and receiving means TRV, it filters out the event message E10 by means of filter means FIL. For this, the filter means FIL apply filter criteria FK2. The event message E10 is irrelevant in respect of the service which is to be provided by means of the service agent DA1. For example, the event message E10 could be a temperature measurement value which is sent cyclically by the network element N1.

The filter criteria FK1, which have already been explained, are also shown in the filter means FIL. This indicates that the filter means FIL can send the filter criteria FK1 to the filter agent FD1, for example, by means of the transmitting and receiving means TRV. It is also possible, however, for example, if the filter agent FD1 is not provided, for the filter means FIL to apply several filter criteria FK1, FK2 in the filtering of event messages sent by the network element N1.

It is to be noted in this connection that the filter means FIL can also apply only a single filter criterion or a single filter rule. The at least one filter criterion or the at least one filter rule can be supplied to the respective service agent, e.g. the service agent DA1, at least partially, as configuration data, and can thus be manipulated by, for example, an operator. The filter criterion or the filter criteria can also be realized, at least partially, by the program code of the respective service agent. Combinations of the two aforesaid variants are also possible.

From the filter means FIL, analysis and instruction means ANA—referred to in short as analysis means ANA in the following—receive the event messages E1-E3, E8, E9 which are relevant to the service agent. The instruction means ANA use relationship rules RL1-RL4 to determine relationships between the event messages E1-E3, E8, E9 in respect of the service to be provided by the service agent DA1, and instruct the user interface module UI or the user interface module UI1 to output the aforementioned event messages according to the determined relationships, as represented in FIG. 1 by an arrow R11. The user interface module UI or the user interface module UI1 thus constitutes an output means. Another interface, for example, one provided by the operating system of the server SV1, for controlling, for example, a monitor and/or a loudspeaker, could also constitute an appropriate output means and optionally also be controlled directly by the service agent DA1.

The filter means FIL, the analysis and instruction means ANA and the transmitting and receiving means TRV are, for example, programme functions of the service agent DA1.

The user interface module UI generates a user interface WUI which contains an output of the instructions sent by the service agent DA1, in the form of a window WDA1 in this case. The window WDA1 could also be generated by the user interface module UI1. The event messages E1-E3, E8, E9, and the relationships RL1-RL4 which exist between them, are displayed visually in the window WDA1. The event messages E1-E3, E8, E9 are hierarchically structured in respect of the service to be provided by means of the service agent DA1, in the present case, the rectification of a hardware fault in the network element N1. In this case, the event messages E2, E3 are dependent on the event message E1, according to the relationships RL1 and RL2 respectively. For example, they are related to one another by a so-called father/son relationship. The event message E1 concerns, for example, the failure of a power supply, and the event messages E2, E3 concern the failure of modules which are dependent on the power supply. The event messages E8, E9 are dependent on the event message E2, according to the relationships RL3 and RL4 respectively. For example, the event messages E8, E9 concern faulty circuits on the module signalled as faulty according to the event message E2. Due to the fact that the event message E1 is represented, so to speak, as the father of all subsequent event messages E2, E3, E8, E9, an operator of the user interface WUI can easily identify that the event message E1 is of prior ranking importance and that, following elimination of the cause of the event message E1, for example, following activation of a redundant power supply, the causes of the event messages E2, E3; E8, E9 which are dependent on the event message E1 can possibly be eliminated. For example, the operator uses the mouse to click on the represented event message E1 and then obtains a menu, offered by the user interface modules UI or UI1 and/or by the service agent DA1, for rectifying the fault. For example, the menu offers a selection of alternative power supplies which can be activated in place of the defective power supply. If an alternative power supply is activated by the operator, then not only is the event message E1 subsequently signalled as "off", but also the dependent event messages E2, E3, since the modules concerned are then again supplied with power, as well as the second-level dependent event messages E8, E9, since the circuits of the module which are again signalled to be functioning, according to the event message E2, function correctly again with an adequate power supply.

Different variants are possible for representing the event messages which are relevant to the service to be provided by means of the service agent DA1.

For example, dependent event messages, e.g. the event messages E2, E3, as well as the second-level E8, E9, could initially be concealed from the operator of the user interface WUI with, for example, only the event message E1 being displayed at first. When the operator activates the display of the event message E1, for example, by clicking with the mouse on the corresponding symbol in the window WDA1, the event messages E2, E3 which are dependent on it become visible, together with the relationships RL1, RL2, the window WDA1 then being output, for example, in the output form VW1 as shown in FIG. 4a. In a further activation stage, the operator can then use the mouse to click on the display of the event message E2 and then obtain the output form VW2 as shown in FIG. 4b, in which the event messages E8, E9 and the relationships RL3, RL4 are output.

In the present case, the relationships RL1-RL4 are represented as arrows, other forms of representation being easily possible. For example, simple lines could be used. Moreover, the relationships RL1-RL4 do not necessarily have to be represented as separate picture elements. It is also conceivable, for example, for the dependence between event messages to be visually represented by representing the event messages concerned in spatial proximity to one another and/or in the same or correlating colours.

Figure 3:
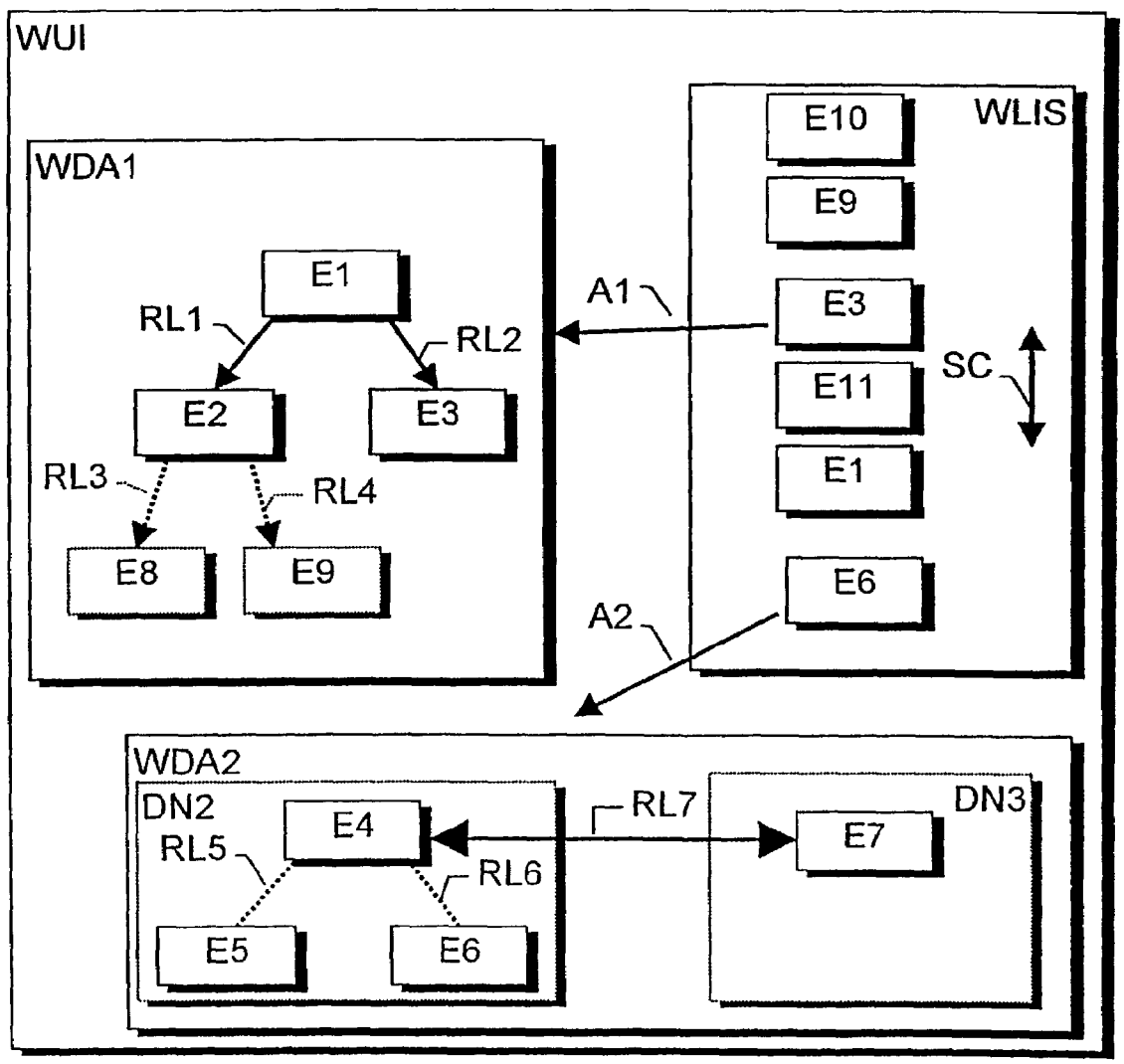
FIG. 3 shows a user interface WUI which is generated by a user interface module UI from FIG. 1, FIGS. 4A, B show two different output forms VW1, VW2, generated by the service agents DA1 of FIGS. 1 and 2, of event messages E1-E3, E8, E9.

In the case of the aforementioned example, different output forms VW1, VW2 are provided in which event messages are partially suppressed or not suppressed. It is also possible, however, for all event messages, or at least a large proportion of the event messages, to be output simultaneously. For example, in the case of the representation of the window WDA1 according to FIG. 3, all event messages E1-E9 are represented, but the less relevant event messages E8, E9 are output with a ranking which is secondary to the event messages E1-E3. In the figure, this is represented by broken lines. In practice, this could be achieved by, for example, restrained colours, shadowing or the like. In the case of the window WDA1, for example, the particular relevance of the event message E1 can be emphasized if the symbol concerned is represented and/or flashes in a luminescent, bright colour.

As already mentioned above, the event messages in the window WDA1 can be represented as picture elements, e.g. symbols, which can be activated. Activation of such a picture element initiates a successive reaction, for example, the offering of a context-sensitive menu and/or another form of representation of one or more event messages, for example, a more detailed representation of the event messages.

Portions of the event message E1 which is relevant per se may have different relevance to the service to be provided by means of the service agent DA1. In the case of a first form of representation of the event message E1, the service agent DA1 issues an instruction to the user interface module UI or to the user interface module UI1 to the effect that only parameters P1-P3 of the event message E1 are displayed, while parameters P4, P5 (see FIG. 5) are suppressed. The parameters P4, P5 are, for example, components of the event message E1 which are less relevant and/or not relevant in respect of the service to be provided by means of the service agent DA1. For example, the parameter P4 could define power values of the failed power supply module. This information is not yet relevant, at least in a first step in rectification of the fault, for example, switching over to a network element which is redundant in relation to the network element N1. In a second form of representation of the event message E1, the parameters P4, P5 are then also output.

In a further form of representing event messages and relationships between them, the event message E1 could be displayed, for example, on a first register card, while the event messages E2, E3 are displayed on a second register card which is initially covered by the first register card. The operator of the user interface WUI can then browse back and forth between the two register cards and possibly a third register card containing the event messages E8, E9.

Presented in the following are further variants of processing, according to the invention, of event messages in connection with the service agent DA2.

In the present case, the service agent DA2 is provided to control and monitor the connection VSS between the network elements N2, N3. The network elements N2, N3 signal event messages, via the connections VN2 and VN3, to the managed objects VO2 and VO3 respectively. The latter forwards to the databank DB via connections V2D and V3D respectively, and to a filter agent FD2 via connections VV2 and VV3 respectively. The filter agent FD2 is an event or alarm forwarding discriminator which filters out event messages which are irrelevant to the service agent DA2. In the present case, the filter agent FD2 forwards to the service agent DA2, via the connections RF2, R22, as well as the connection module RM located between the latter, all event messages which in any way concern the connection VSS. These event messages include, for example, whether one of the network elements N2, N3 is faulty or has failed, whether an input/output module serving the connection VSS has failed in one or both of the network elements N2, N3, the usage of the connection VSS and charges incurred on the connection VSS. If event messages sent by the network elements N2, N3 do not concern the connection VSS and are therefore irrelevant to the service agent DA2, they are filtered out by the filter agent FD2 on the basis of filter criteria, not represented, which are predefined and/or transmitted by the service agent DA2. Event messages which are relevant to the service agent DA2 are, for example, event messages E4-E7, whereas an event message E11 is irrelevant to the service agent DA2 or the service which is to be provided by means of the latter.

In the case of the embodiment example, the service agent DA2 obtains event messages E4-E7 which have already been filtered and are relevant to it. The filter means, not represented, of the service agent DA2 are provided only for the purpose of sending filter criteria to an external filter agent, in the present case, the filter agent FD2. It is also possible for the service agent DA2 to start the filter agent FD2, communicate the necessary filter criteria to it and, for example, when the service agent DA2 is terminated, terminate the filter agent FD2 again. In addition, the service agent DA2 can send other filter criteria to the filter agent FD2 during its operation and thus, as it were, reconfigure the latter.

The service agent DA2 determines relationships RL5-RL7 between the relevant event messages E4-E7 and instructs the user interface module UI or the user interface module UI3 to output the event messages E4-E7 according to the relationships RL5-RL7. In the figure, this is represented by an arrow R22. In accordance with the instructions of the service agent DA2, the user interface module UI outputs on its user interface WUI a window WDA2 (in the case of the variant of the invention, the user interface module UI3 outputs the window WDA2) which represents the event messages E4-E7 in the manner requested by the service agent DA2. The event message E4 concerns, for example, a connection module for establishing and operating the connection VSS of the network element N2. This module has failed and, consequently, the event message E4 is displayed. Due to the failure of this connection module, a connection module serving the connection VSS has also failed, or is at least signalling a fault, in the network element N3, this being indicated by the event message E7 in respect of the network element N3. The event messages E4, E7 are classified by the service agent DA2 as being of equal value and consequently represented on one level. The relationship RL7 is indicated by a double arrow between the event messages E4, E7. The event message E7 is displayed in a display area DN3 assigned to the network element N3, the event message E4 being displayed in a display area DN2 assigned to the network element N2. Also displayed in the latter display area are the event messages E5, E6, which are connected to the event message E4 through the relationships RL5, RL6. For example, the event message E5 can concern a fault report of a charge registering module which acquires a fault status due to the fault constituting the basis of the event message E4, the failure of the connection module, and consequently sends a fault report containing the event message E5.

As already explained, the network elements N1-N3, or the managed objects VO1-VO3 representing them, also signal event messages to the databank DB. In the present case, the databank DB serves as a group agent for recording all event messages originating from the network elements N1-N3. It is also possible, however, for a separate group agent, for recording the event messages signalled by the network elements N1-N3, to be provided instead of the databank DB or as a supplement to it. The databank DB sends the received event messages, without filtering, to the connection module RM via a connection RD. The connection module RM forwards the event messages, via a connection RO2, to the list module OVV which instructs the user interface module UI or the user interface module UI2, via the connection RO1, to output the event messages in the form of an event list WLIS.

In the present case, the event list WLIS is a window with a so-called scroll bar SC, by means of which the display area of the window can be adjusted. Event messages are represented in the event list WLIS in known manner, the event messages being displayed, for example, in the sequence in which they are received. As an example for other event messages which are not represented, the event list contains the event messages E10, E8, E3, E11, E1, E6. Due to the unstructured representation of the aforementioned event messages in known manner, operation of the user interface WUI is comparatively difficult for an operator, as is made particularly clear by the representation, according to the invention, of the event messages in the windows WDA1, WDA2 which, in direct comparison, is perceptibly more graphic and more clearly arranged.

Unlike known list representations, however, the present event list WLIS permits easy navigation of the user interface WUI to the windows WDA1, WDA2. For example, when a mouse is clicked on the event message E3 in the event list WLIS, an action A1 is performed which switches over to the window WDA1 of the service agent DA1. The same applies to clicking on the event message E6 in the event list WLIS, whereby an action A2 opens the window WDA2 or switches over to the latter. In this way, the operator of the user interface WOI very rapidly obtains an overview of the context in which an event message from the event list WLIS is to be placed. For example, the event message E3 is basically an event message having secondary ranking to the event message E1, as is evident from the representation shown by the window WDA1. The same applies, analogously, to the event message E6 and the window WDA2.

Activation A1, A2 of an event message in the event list WLIS results in, for example, the following: the user interface module UI or the user interface module UI2 signals the activation operation to the list module OVV which then, for example, starts the service agent DA1 and/or DA2. The latter then generates the window WDA1 or WDA2 respectively. There can also be an assignment table, stored in the user interface modules UI and/or UI2, by means of which the respective user interface module UI or UI2 can determine which service agent DA1, DA2 is to be activated.

It is understood that the activation operation can also originate, conversely, from the windows WDA1, WDA2 of the service agents DA1, DA2. For example, the event list WLIS could be turned on by the user interface module UI or a corresponding command sent to the user interface module UI2 upon activation of the event message E3 in the window WDA1. Moreover, a service agent may optionally also activate further service agents. For example, an event message may be relevant to several service agents. If such an event message is activated in a service agent, for example, by double-clicking a mouse or by another operator input, one or more service agents to which the event message concerned is also relevant are thereupon activated.

The service agents DA1, DA2 can be in continuous operation, i.e., for example, started upon the system start of the server SV1 and then only terminated again when the operation of the server SV1 is to be terminated. It is also possible, however, for the service agents DA1, DA2 to be started on an ad hoc basis, i.e., when required, for example, by means of an operator action on the user interface UI.

It must also be mentioned in this connection that the user interface module UI can only generate, as it were, the start window of the network management system NMS, from which the service agents DA1, DA2 and/or the list module OVV and/or the user interface modules UI1-UI3 can be activated if required, for example, through an appropriate operator action.

In the following scenario, for example, the service agent DA1 is started through a user input, e.g., a mouse click on the event message E3 in the event list WLIS. The server SV1 then begins to execute the program code of the service agent DA1. The service agent DA1 requests the event messages which are relevant to it from the server SV2.

In this case, the service agent DA1 can send a request to the databank DB to send all available event messages. From the event messages transmitted via the connections RD, R12, the service agent DA1 then first filters out, using filter criteria FK3, for example, the event messages which concern the network elements N2, N3. Through further filtering of the event messages by means of the filter criteria FK1, FK2, the service agent DA1 determines the event messages E1, E2, E3, E8, E9 which are relevant to the service which is to be provided by means of the service agent DA1. The further procedure in the determination of relationships between these event messages has already been described.

In another variant for filtering the event messages transmitted by the databank DB, the service agent DA1 starts a filter agent FDB which is connected between the databank DB and the connection module RM by means of connections R3, R4. The service agent DA1 instructs the server SV2 to start the filter agent FDB. The service agent DA1 also transmits the filter criteria FK3 to the server SV2. The filter criteria FK3 can be forwarded to the filter agent FDB as start parameters, for example. They can also be forwarded to the filter agent FDB following starting of the latter, for example, when the service agent DA1 logs on to the filter agent FDB. In any case, the databank DB forwards its stored event messages to the filter agent FDB. The filter agent FDB uses the filter criteria FK3 to filter out the event messages in respect of the network elements N3, N4 which are irrelevant to the service agent DA1, while forwarding to the service agent DA1 the event messages which concern the network element N1.

Further variants of the invention can be easily realized:

In other modes of representing event messages and relationships between them, the modules of the network elements N1-N3 could be represented, for example, and the event messages represented in connection with the respective module to which the event message relates.

It is understood that a service agent can also generate several modes of representing event messages and relationships between them which are based on the respective service, an operator action and/or the service agent itself switching over, for example, between the aforementioned module representation and a list representation or a tabular representation of the event messages.

For example, the filter agent FDB could form a constituent part of the databank DB or of another group agent. The service agent DA1 and/or DA2 could form a constituent part of the user interface module UI.

Further service agents, in addition to the service agents DA1, DA2, could also be provided in the server SV1.

The service agents DA1, DA2 could also be executed by the server SV2 and controlled, for example, via the user interface UI of the server SV1. It is also possible for the service agents DA1 to be executed as a client-server application with, for example, the server part being executed by the server SV2 and the client part being executed by the server SV2. It is also conceivable in this case for the client part(s) to form a constituent part of the user interface module UI.

It is understood that the invention can be applied in any type of communication network. For example, the network elements N1-N3 could be computers, e.g., personal computers or workstations of a computer network.

The managed objects VO1-VO3 can send event messages spontaneously to the service agents DA1, DA2, i.e., without previous polling. It is also possible, however, for the service agents DA1, DA2 to cyclically poll event messages, for example, from the filter agents FD1 and FD2 respectively and/or from the managed objects VO1 and VO2, VO3 respectively.

The invention claimed is:

1. A method for operating a telecommunications network, comprising:
 transmitting event messages concerning at least one network element of the telecommunications network to a service agent for provision of at least one of a maintenance, monitoring or a control service to the at least one network element;
 filtering out the event messages which are irrelevant to the service to be provided by means of the service agent;
 determining, by the service agent, at least one relationship between at least one first relevant event message and at least one second relevant event message relating to the maintenance, monitoring or control service to be provide and
 instructing an output means, via the service agent, to output at least one of the first and second relevant event messages according to the at least one relationship, the first and second relevant event message being output in dependence on their relevance to the maintenance, monitoring or control service to be provided, and wherein instructing an output means to output at least one first relevant event message with priority over at least one second relevant event message, to provide a first output form in which the at least one second relevant event message is suppressed, and a second output form in which the at least one second relevant event message is output and only a particular portion of a relevant event message is output, which particular portion is relevant to the service to be provided.

2. The method according to claim 1, wherein the first relevant event message and the second relevant event message are output in dependence on their relevance to the maintenance, monitoring or control service to be provided.

3. The method according to claim 1, wherein, in determining the at least one relationship, the service agent determines that the at least one second relevant event message is dependent on the at least one first relevant event message.

4. The method according to claim 1, wherein the at least one first and second relevant event messages are essentially output in a tree-type hierarchical representation.

5. The method according to claim 1, wherein the at least one first relevant event message and the at least one second relevant event message are output according to the at least one relationship, in an output form based on the maintenance, monitoring or control service, and in the form of at least one of a list, a hierarchical representation, or a graphical representation.

6. The method according to claim 1, wherein a group agent records the event messages concerning the at least one network element of the telecommunications network, and at least one of the service agent or a filter agent located prior to the group agent at least partially filters out the event messages which are irrelevant to the monitoring, maintenance and control service to be provided.

7. The method according to claim 1, wherein, via a user interface, at least one event message is displayed which is relevant to the monitoring, maintenance or control service to be provided by means of the service agent, and the service agent is activated, upon an operator input, with respect to the at least one displayed event message.

8. A network management system, embodied in a computer readable storage medium and hardware, for provision of at least one of a maintenance, monitoring or control service to at least one network element of a telecommunications network, the system comprising:
 receiving means for receiving event messages which concern the at least one network element;
 filter means for filtering out event messages which are irrelevant to the maintenance, monitoring or control service to be provided by the system; and
 analysis and instruction means for determining at least one relationship between at least one first relevant event message and at least one second relevant event message relating to the maintenance, monitoring or control service to be provided and for instructing output means to output at least one of the first and second relevant event messages according to the at least one relationship, the at least one first relevant event message and the at least one second relevant event message being output in dependence on their relevance to the maintenance, monitoring or control service to be provided, and wherein instructing output means to output at least one first relevant event message with priority over at least one second relevant event message, to provide a first output form in which the at least one second relevant event message is suppressed, and a second output form in which the at least one second relevant event message is output and only a particular portion of a relevant event message is output, which particular portion is relevant to the service to be provided.

9. The system according to claim 8, wherein the filter means are designed for at least one of (i) application of at least one filter criterion by the system and (ii) sending at least one filter criterion to at least one of a filter agent located prior to the system or to a group agent, the group agent being provided to record event messages concerning the at least one network element.

10. A computer-readable storaae medium carrying proaram code executable by a computer for implementing a service agent for provision of at least one of a maintenance, monitoring or control service to .at least one network element of a telecommunications network, the computer performing the following functions on execution of said code:
receiving event messages which concern the at least one network element;
filtering out event messages which are irrelevant to the maintenance, monitoring or control service to be provided by means of the service agent; and
determining at least one relationship between at least one first relevant event message and at least one second relevant event message relating to the maintenance, monitoring or control service to be provided and instructing output means to output at least one of the first and second relevant event messages according to the at least one relationship, the at least one first relevant event message and the at least one second relevant event message being output in dependence on their relevance to the maintenance, monitoring or control service to be provided, and wherein instructing output means to output at least one first relevant event message with priority over at least one second relevant event message, to provide a first output form in which the at least one second relevant event message is suppressed. and a second output form in which the at least one second relevant event message is output and only a particular portion of a relevant event message is output, which particular portion is relevant to the service to be provided.

* * * * *